(12) United States Patent
Gordon

(10) Patent No.: US 8,848,236 B2
(45) Date of Patent: Sep. 30, 2014

(54) CHANGING THE RESOLUTION OF A PRINTER USING A PULSE TRAIN

(75) Inventor: Mark Christopher Gordon, Vienna, VA (US)

(73) Assignee: Markem-Imaje Corporation, Keene, NH (US)

( * ) Notice: Subject to any disclaimer, the term of this patent is extended or adjusted under 35 U.S.C. 154(b) by 34 days.

(21) Appl. No.: 13/548,121

(22) Filed: Jul. 12, 2012

(65) Prior Publication Data

US 2013/0176577 A1 Jul. 11, 2013

Related U.S. Application Data

(60) Provisional application No. 61/507,107, filed on Jul. 12, 2011.

(51) Int. Cl.
- *G06K 15/02* (2006.01)
- *G06K 15/00* (2006.01)
- *B41J 11/42* (2006.01)
- *B41J 2/21* (2006.01)

(52) U.S. Cl.
CPC .......... *G06K 15/1894* (2013.01); *G06K 15/005* (2013.01); *B41J 11/425* (2013.01); *B41J 2/2132* (2013.01)
USPC ........................................................ 358/1.2

(58) Field of Classification Search
USPC ........................................................ 358/1.2
See application file for complete search history.

(56) References Cited

U.S. PATENT DOCUMENTS

| 5,539,443 | A | * | 7/1996 | Mushika et al. .............. 347/194 |
| 6,719,389 | B2 | | 4/2004 | Hoisington |
| 7,281,778 | B2 | | 10/2007 | Hasenbein |
| 7,360,853 | B2 | | 4/2008 | Barss |
| 8,579,397 | B2 | | 11/2013 | Barss |
| 2004/0252142 | A1 | * | 12/2004 | Struk et al. ........................ 347/2 |
| 2006/0164450 | A1 | | 7/2006 | Hoisington |
| 2006/0279759 | A1 | * | 12/2006 | Choi ............................ 358/1.13 |

OTHER PUBLICATIONS

Title: HP'S $2,395 Laserjet III Hits the Streets With PCL5 and Enhanced Resolution Authors: Anon Source: Printout vol. 14, No. 2, Feb. 1990, pp. 1-3, 12-15 Publication Year: 1990 Pira Accession No. 9324900 Pira Abstract Nos. 02-90-02234.*
RD 541034, May 2009, Anon.*

* cited by examiner

*Primary Examiner* — Eric A Rust
(74) *Attorney, Agent, or Firm* — Fish & Richardson P.C.

(57) ABSTRACT

A variable resolution print system is provided. The system includes a variable resolution printer coupled to a positional encoder and a configuration module. The position encoder provides a pulse train to a controller in the variable resolution printer, the pulse train representing the movement of a target relative to the printer. A user of the print system enters or sets a desired resolution for printing via the configuration module. The controller calculates the difference between pulses in the pulse train. The controller then determines an adjustment to the calculate difference based on the desired resolution. The adjustment is used to generate a pulse train that actuates one or more print head of the printer.

20 Claims, 4 Drawing Sheets positional signal

←—————— 0.1 inch ——————→

600 dpi 300 dpi 200 dpi

CHANGING THE RESOLUTION OF A PRINTER USING A PULSE TRAIN

CROSS REFERENCE TO RELATED APPLICATIONS

This application claims benefit to U.S. Provisional Application 61/507,107 filed. Jul. 12, 2011, entitled "Variable Resolution Printer," which is incorporated herein by reference in its entirety.

FIELD OF THE INVENTION

This application relates generally to computer driven printers and more specifically to industrial printing.

BACKGROUND OF THE INVENTION

Printers print in discrete amount of material to create an inidica on the page. The discrete amount of material is often referred to as a "dot." The number of dots that can be printed without overlap defines the resolution of the printer. The smaller the "dot" the more dots that can be fit in an area prior to overlap (i.e., the dots can be spaced closer together). The term dpi or "dots per inch" refers to the number of dots that can be printed in a horizontal line. For example, 600 dpi means that the size of the mark made by the printer cannot be larger than 1/600 of an inch. This is referred to as the maximum resolution of the printer.

An image is represented in memory by an N ×N matrix of pixels. This matrix is subsequently mapped to a print head or print heads of the printer by the print controller. Although the printer has a maximum dpi, the print controller can cause the printer to print at a frequency which results in a lower dpi count than the maximum dpi of the printer. If the controller causes a printer, for example, to print a maximum of 300 dots per inch the resolution of the printed image will be 300 dpi, despite the fact that the printer might have a higher maximum resolution.

The position of a print target relative to the printer must be known in order for the printer to know when to print on the target. Sensors or control mechanisms are used to ascertain this relative position. Examples of control mechanism include a stepper motor or a positional encoder (e.g., an optical encoder). A stepper motor controls the position of the target whereas a positional encoder indicates the position of the target on a moving transport medium. When the position of the target matches the location where an indicia should be created, the print controller causes a mark to be placed on the target, at the position.

Frequently it is desired to print at resolutions other than the resolution enabled by the positional encoder coupled to the printer. For example, a barcode may need to be printed at a small size. A single bar in a barcode may only be one or two pixels wide and have a fixed ratio of wide bars to narrow bars, if the layout of the bar code does not align with the print resolution capabilities of a printer, barcodes that cannot be subsequently scanned may be printed. In addition, lower dpi printing uses less consumables such as ink, allowing less expensive printing. Thus, such a capability is highly desirable in applications such as high volume industrial printing.

In the past, printers used encoder translation to attempt to alter the native resolution of the printer. For example, if the pulse train generated by the encoder is sped up the resulting printed document is compressed. This technique has many limitations. Because the printer function itself is not changed, the parameters of the printer must be changed. For example, all elements of the printed indicia are compressed or expanded, even if this is not desired. Configuration parameters can also be affected since these parameters are frequently based on the accuracy of the incoming positional information.

What is therefore needed is a printer that allows flexible, simple configuration while maintaining correct print function across a large range of print resolutions.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1A:
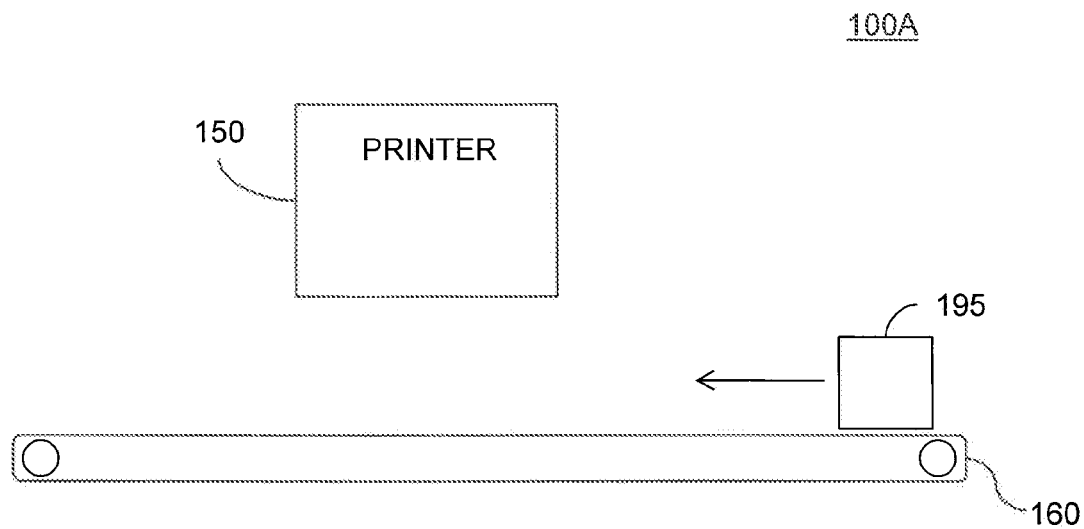
FIGS. 1A and 1B depict exemplary operating environments for the variable resolution printer, according to embodiments of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

Figure 1B:
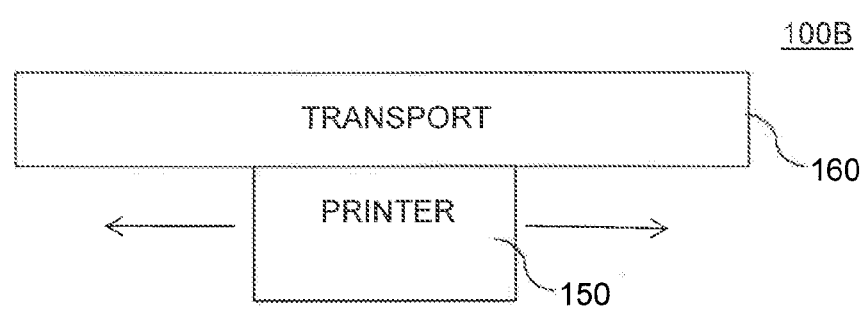

FIGS. 1A and 1B depict exemplary operating environments 100A, 100B for the variable resolution printer, according to embodiments of the invention. Operating environments 100A and 100B each include a variable resolution printer 150 and a target 195. Printer 150 is configured to print indicia (e.g., a label or a barcode) onto a target. A target is an object on which the printer is printing. A target may be any material including, but not limited to, paper, plastic, glass, metal, or a composite material.

In the embodiment depicted in FIG. 1A, printer 150 is substantially stationary and the target 195 is moving past the printer. Operating environment 100A therefore includes a transport mechanism 160. In embodiments, transport mechanism 160A is any mechanism that can move an object such as a conveyer belt. Target 195 is placed into physical contact with transport mechanism 160. Transport mechanism 160A moves target 195 into the field of printer 150.

In the embodiment depicted in FIG. 1B, printer 150 moves and one or more targets 195 are stationary. In operating environment 100B, printer 150 is coupled to transport mechanism 160B. Transport mechanism 160B is configured to move the printer 150 proximate to a target such that printer 150 can print one or more indicia onto the target.

Figure 2:
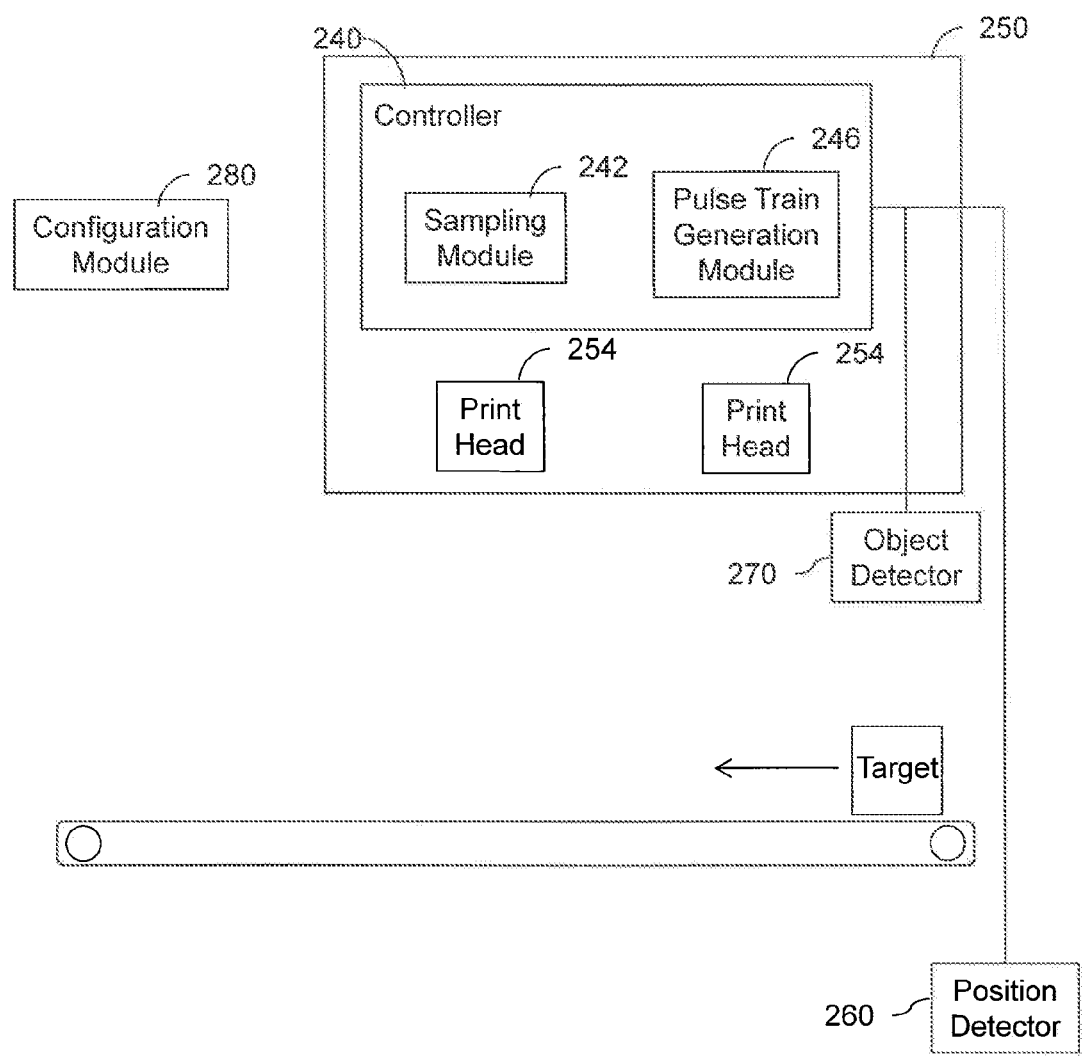
FIG. 2 depicts a system for variable resolution printing, according to embodiments of the present invention.

FIG. 2 depicts a system 200 for variable resolution printing, according to embodiments of the present invention. System 200 includes a variable resolution printer 250, a position sensor 260, and printer configuration module 280.

Variable resolution printer 250 includes a controller 240 and one or more print heads 254. A print head is configured to deliver markings to the substrate of the target. For example, the print head may utilize ink to deliver the markings (e.g., a "dot") to the substrate of the target. Controller 240 is configured to perform real-time control of the print head. In an embodiment, controller 240 is hardware. Alternatively, controller 240 may be firmware. Controller 240 is discussed in further detail below.

High quality printing requires precise knowledge of the relative speed and/or position of the target relative to the print head. Position sensor 260 is coupled to controller 252 of variable resolution printer 250. Position sensor 260 is optional. When present, position sensor 260 provides data that allows controller 240 to determine the velocity and location of the target. As would be appreciated by a person of skill in the art, many techniques (e.g., an optical encoder) can be used to obtain this information. For example, a positional encoder can be used to indicate relative position of the print head to the target object. The data generated by the position sensor may indicate the velocity of the transport medium.

Alternatively, a positioner such as a stepper motor can be used to position the printer or target object to a known position. When a stepper motor is utilized, controller 240 (or similar element of printer 250) generates a pulse train that causes the stepper motor to increment the position of the transport (e.g., conveyer belt).

Figure 3A:
FIGS. 3A-3D depicts exemplary pulse trains used to determine print resolution.

In embodiments, position sensor 260 (or controller 240 in the case of a stepper motor type embodiment) is configured to generate a pulse train that indicates position over time and allows printer 250 to calculate the velocity and/or position of the target relative to the printer based on the desired print resolution of the indicia to be printed on the document. FIG. 3A depicts an exemplary pulse train generated by a position sensor. In current systems, this position information is often used directly by the print head actuating circuitry to print at the correct time and duration for an image at a specific resolution. For example, if each line in FIG. 3A represents the rising edge of a pulse, the print controller actuates the print head on each of these rising edges. Using this method limits the print resolution to the resolution of the positional encoder. Changing the resolution of printed indicia (beyond the methods listed below) requires altering the incoming positional encoder information.

Figure 3B:
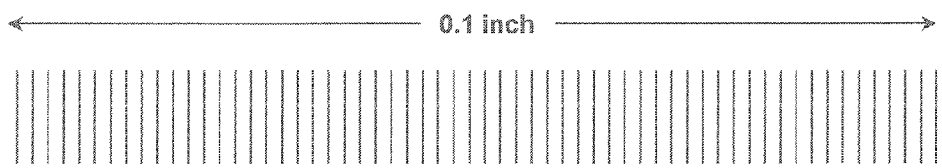
Figure 3C:
Figure 3D:

Resolution of print can be lowered by skipping pulses in a generated pulse train. As discussed above, the pulse train may be an input to the controller from the position sensor or alternatively may be generated by the controller and output to a component of the transport (e.g., a stepper motor coupled to the transport). Because the technique skips pulses, printers using this technique can only print at whole number divisors of the maximum resolution the printer is able to print. In the example of FIG. 3, position signal 310 has pulses occurring such that 600 dots can be placed by a print head on the target in an inch (e.g., 600 dpi) as illustrated in FIG. 3B. If controller 252 skips every other pulse of the pulse train, the printer can achieve a 300 dpi resolution, as illustrated in FIG. 3C. If every third pulse was used by controller 252, the resolution would be 200 dpi. Printing at a different resolution such as 500 dpi is not possible as no set of pulses exist at that resolution. That is, controller 252 does not have the required information to print at variable resolutions other than as described above.

Embodiments of the present invention overcome this limitation of prior systems by allowing printing at any resolution. Controller 240 includes a sampling module 242 and a pulse train generation module 246. Sampling module 242 is configured to receive a pulse train. For example, when a position sensor 260 is used, sampling module samples the pulse train generated by the position sensor and received by the controller. When controller generates the pulse train, the sampling module samples the pulse train generated by the controller and output to the control mechanism for the transport. Utilizing the received pulses, the sampling module calculates the time between pulses. The sampling module then adjusts the calculated time between pulses based on the desired print resolution.

The pulse generation module 246 subsequently generates a new pulse train (or similar mechanism) to be used to control the firing of the print heads. The adjustment is used to set the delay between rising (or falling) edges of pulses. For example, when the print head fires, the adjustment is used to calculate the time when the print head should next fire.

The desired resolution for printing upon the target is configured in configuration module 280. Configuration module 280 is coupled to printer 250. In embodiments, the configuration module 280 provides data to controller 240 of printer 250. In an embodiment, the configuration module 280 can be a user interface that allows the user to create an indicia layout (such as a word processor document) and specify the desired resolution at which the document should be printed on the target. Alternate implementations of the configuration module 280 are possible, such as a configuration file or physical dial. Typically, when a document is printed, the resolution of the printer is selected at print time from a discrete set of values supported by the printer, for example 1200, 600, and 300 dpi. In the current invention the number of resolutions is limited only by practical considerations (for example 2 dpi would most likely provide no visible indicia) and the maximum dpi of the print head attached to the current printing system. Thus, the desired print resolution can be specified with little knowledge of the capabilities of the printer and can be selected before the printer on which the document is to be printed is known.

The calculated adjustment is such that a prior average velocity of the transport or target is used to calculate the correct pulse width for the next pulse in the virtual pulse train. In an embodiment, this average velocity the most recent prior reading from the sampling module 242, however other values or combinations of values could be used. The adjustment can be used to increase or decrease the printed resolution, limited only by the physical properties of the print head being used. In addition, sampling module 242 may be further configured to apply smoothing or other mathematical functions to improve the quality of the print.

In an embodiment, configuration module 280 would also be used to specify the above parameters, such as distance from the object detection module 280 to the print head 254 and distance between multiple print heads 254. Alternatively, these values could be fixed or configured via alternate means, such as a configuration interface on the controller 240 or stored as fixed values in the controller 240 or elsewhere. Although configuration module 280 is depicted as a separate module, configuration module 280 may be included as a component of printer 250.

System 200 may further include an object detection module 270. Object detection module 270 is configured to detect an edge (e.g., the leading edge of an object). For example, object detection module 270 may detect the leading edge of a target and provide an indication to controller 240. Printer 250 may then wait a certain number of pulses before printing based on the native resolution of the pulse train. If the information from the object detection module 270 is stored in units of native pulses, the pulse train generated by the controller would also result in this information be scaled, causing incorrect position of the printing on the target. Additionally, if printer 250 has multiple consecutive columns of print heads, the time between actuating the columns may be in units of native pulses. In an embodiment of the invention, sampling module 242 is configured to adjust these values so physical distances in units of native pulses remain constant as the dpi of printing varies. This technique allows uniform configuration with varying print resolution while achieving nearly identical physical results (with the exception of resolution).

In an alternate embodiment, controller 240 is further coupled to one or more additional printers. In this embodiment controller 240 is utilized to control the print head(s) of each coupled printer. In order to provide this control, controller 240 is provided with information related to position of each printer and its associated print heads.

Figure 1B:
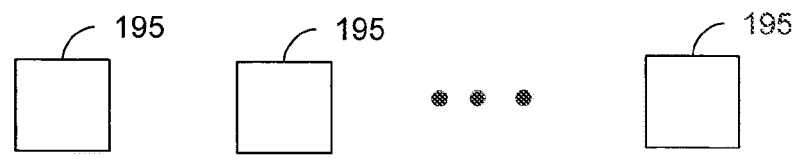
Figure 4:
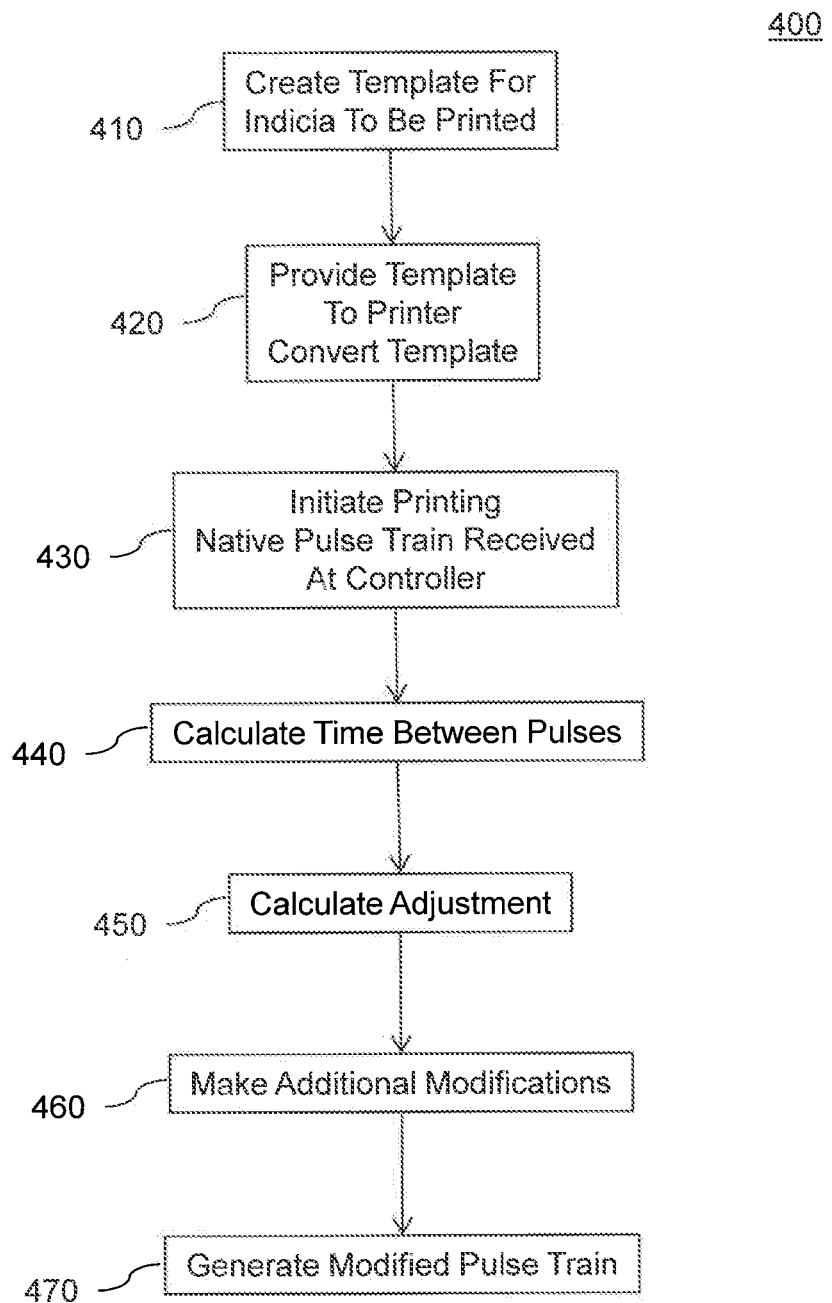
FIG. 4 depicts a flowchart of an exemplary method for variable resolution printing, according to embodiments of the present invention.

FIG. 4 depicts a flowchart 400 of an exemplary method for variable resolution printing, according to embodiments of the present invention. Flowchart 400 is described with continued reference to the embodiments of FIGS. 1 and 2. However, flowchart 400 is not limited to those embodiments.

In step 410, a template (layout) for the indicia to be printed is created. The template includes properties of the indicia such as the desired resolution for printing the indicia on a target.

In step 420, the template is provided to printer 250 which converts the template to a form that can be printed by printer 250. In an embodiment, controller 240 is configured to convert the received template.

In step 430, printing is initiated and a native pulse train is received by controller 240. Native pulse train may be generated by a position sensor 260 or alternatively by controller 240.

In step 440, the time between pulses in the received native pulse train is calculated. Note that in this step, the average time between a series of pulses may also be calculated.

In step 450, an adjustment to the calculated time between pulses is determined based on the desired print resolution. In embodiments, the desired resolution is provided to the printer by a configuration module.

In step 460, additional modifications are made to the adjustment calculated in step 450. This step is optional. When present, the applied modifications include, for example, smoothing and/or mathematical functions.

In step 470, the adjustment is applied to generate a modified (target) pulse train. The modified pulse train is utilized to actuate one or more print heads to print indicia on the target.

4.0 Conclusion

While various embodiments of the present invention have been described above, it should be understood that they have been presented by way of example only, and not limitation, It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A variable resolution printer, wherein the printer has a fixed native resolution, comprising:
    a controller configured to receive configuration data and a first pulse train having a plurality of pulses representing the movement of a target, wherein the configuration data specifies a desired print resolution, the controller including a module configured to calculate a difference between pulses in the first pulse train, to determine an adjustment to the calculated difference based on the desired print resolution, and to generate a second pulse train based on the determined adjustment; and
    a print head coupled to the controller, wherein the print head is configured to print indicia on the target based on the second pulse train generated by the controller;
    wherein the module is configured to calculate a correct pulse width for a next pulse in the second pulse train based on a prior average velocity of the target.

2. The variable resolution printer of claim 1, further comprising:
    a configuration module coupled to the controller.

3. The variable resolution printer of claim 2, wherein the configuration module includes a user interface enabling a user to enter the configuration data, which comprises an indicia layout and specifies the desired print resolution.

4. The variable resolution printer of claim 3, wherein the adjustment increases or decreases a print resolution, limited only by physical properties of the print head.

5. The variable resolution printer of claim 1, further comprising:
    an object detection module configured to detect an edge of the target.

6. The variable resolution printer of claim 5, wherein the controller is further configured to generate adjustments to data generated by the object detection module.

7. The variable resolution printer of claim 1, wherein the controller is configured to use a rising edge of the pulses in the first pulse train to calculate the difference between pulses in the first pulse train.

8. The variable resolution printer of claim 1, wherein the controller is configured to use a falling edge of the pulses in the first pulse train to calculate the difference between pulses in the first pulse train.

9. The variable resolution printer of claim 1, wherein the module comprises a sampling module, and the prior average velocity of the target is based on a most recent prior reading from the sampling module.

10. A variable resolution printer, wherein the printer has a fixed resolution, comprising:
    a print head configured to print indicia on a target; and
    a controller coupled to the print head, the controller configured to receive a native pulse train representative of a velocity of the print head relative to the target or of the target relative to the print head, and to dynamically generate an adjusted pulse train, based on a desired print resolution and a difference between pulses of the native pulse train, to allow the print head to print at variable resolutions;
    wherein the controller comprises a sampling module configured to adjust information provided by an object detection module, and adjust timing for actuating columns of the print head, so physical distances in units of native pulses remain constant as DPI (dots per inch) of printing varies.

11. The variable resolution printer of claim 10, wherein the controller is configured to calculate an average time between a series of native pulses.

12. The variable resolution printer of claim 11, wherein the average time between the series of native pulses is based on a most recent prior reading from the sampling module.

13. The variable resolution printer of claim 10, wherein the sampling module is configured to apply a smoothing function to improve print quality.

14. The variable resolution printer of claim 10, further comprising:
    a configuration module coupled with the controller.

15. The variable resolution printer of claim 14, wherein the configuration module includes a user interface enabling a user to enter configuration data that specifies the desired print resolution.

16. The variable resolution printer of claim 15, wherein the adjusted pulse train increases or decreases a print resolution, limited only by physical properties of the print head.

17. A variable resolution printer, wherein the printer has a fixed native resolution comprising:
- a controller configured to receive configuration data and a first pulse train having a plurality of pulses representing the movement of a target, wherein the configuration data specifies a desired print resolution, the controller including a module configured to calculate a difference between pulses in the first pulse train, to determine an adjustment to the calculated difference based on the desired print resolution, and to generate a second pulse train based on the determined adjustment;
- an object detection module configured to detect an edge of the target; and
- a print head coupled to the controller, wherein the print head is configured to print indicia on the target based on the second pulse train generated by the controller;
- wherein the module of the controller comprises a sampling module configured to adjust information provided by the object detection module, and adjust timing for actuating columns of the print head, so physical distances in units of native pulses remain constant as DPI (dots per inch) of printing varies.

18. The variable resolution printer of claim 17, wherein the module of the controller is configured to calculate a correct pulse width for a next pulse in the second pulse train based on a prior average velocity of the target.

19. The variable resolution printer of claim 18, wherein the prior average velocity of the target is based on a most recent prior reading from the sampling module.

20. The variable resolution printer of claim 17, wherein the sampling module is configured to apply a smoothing function to improve print quality.

* * * * *